United States Patent
Kopylov (10) Patent No.: US 12,417,298 B2
(45) Date of Patent: Sep. 16, 2025

(54) SYSTEMS AND METHODS FOR MANAGING APPLICATION DATA

(71) Applicant: APPLYBOARD INC., Kitchener (CA)

(72) Inventor: Viktor Kopylov, Waterloo (CA)

(73) Assignee: APPLYBOARD INC., Kitchener (CA)

(*) Notice: Subject to any disclaimer, the term of this patent is extended or adjusted under 35 U.S.C. 154(b) by 188 days.

(21) Appl. No.: 18/466,368

(22) Filed: Sep. 13, 2023

(65) Prior Publication Data

US 2024/0095379 A1  Mar. 21, 2024

Related U.S. Application Data

(60) Provisional application No. 63/406,865, filed on Sep. 15, 2022.

(51) Int. Cl.
*G06F 21/60* (2013.01)

(52) U.S. Cl.
CPC .................. *G06F 21/602* (2013.01)

(58) Field of Classification Search
CPC ...................................... G06F 21/602
See application file for complete search history.

(56) References Cited

U.S. PATENT DOCUMENTS

| | | |
|---|---|---|
| 7,478,064 B1 | 1/2009 | Nacht |
| 11,188,836 B2 | 11/2021 | Basiri et al. |
| 11,580,427 B2 | 2/2023 | Basiri et al. |
| 2002/0103749 A1 | 8/2002 | Agudo et al. |
| 2003/0172109 A1* | 9/2003 | Dalton ............. G06F 21/62 709/203 |
| 2006/0265258 A1 | 11/2006 | Powell et al. |
| 2009/0313200 A1 | 12/2009 | Petrucelli |
| 2014/0011180 A1 | 1/2014 | Tomaziefski et al. |
| 2014/0279643 A1 | 9/2014 | Ye |
| 2015/0006423 A1 | 1/2015 | Ma et al. |
| 2015/0006424 A1 | 1/2015 | Ma et al. |

(Continued)

OTHER PUBLICATIONS

McNamara et al., "Natural language processing in an intelligent writing strategy tutoring system", Oct. 6, 2012://link.springer.com/article/10.3758/s13428-012-0258-1 (Year: 2012), pp. 499-515.

*Primary Examiner* — Abiy Getachew
(74) *Attorney, Agent, or Firm* — SMART & BIGGAR LP; Jason B. Hynes; Joanna Cheuk-Yu Ma (57) ABSTRACT

Systems and methods are provided for managing application data. An example method involves operating a management processor to receive an initial application data for an applicant; store the initial application data; generate an initial cryptographic hash based on the initial application data; generate a preview of a first application for the applicant based on the initial cryptographic hash; and receive subsequent application data for the applicant. The initial application data and the subsequent application data include data objects corresponding to one or more fields of the first application. The method further involves operating the processor to, for each subsequent application data, store the subsequent application data as a separate and distinct record; generate a subsequent cryptographic hash based on a current immediate prior cryptographic hash and the subsequent application data; and generate a preview of the first application based on the subsequent cryptographic hash.

20 Claims, 6 Drawing Sheets

(56) References Cited

U.S. PATENT DOCUMENTS

| | | |
|---|---|---|
| 2015/0050631 A1 | 2/2015 | Reynaldo |
| 2015/0066559 A1 | 3/2015 | Brouwer |
| 2016/0163009 A1 | 6/2016 | Saedy et al. |
| 2021/0240857 A1* | 8/2021 | Bandi .................... G06F 21/64 |
| 2022/0207396 A1 | 6/2022 | Basiri et al. |
| 2022/0391519 A1* | 12/2022 | Trim ..................... G06N 20/20 |
| 2023/0229529 A1* | 7/2023 | Kopylov ................ G06F 9/542 |
| | | 709/201 |

* cited by examiner

SYSTEMS AND METHODS FOR MANAGING APPLICATION DATA

CROSS-REFERENCE TO RELATED APPLICATIONS

This application claims priority from U.S. Provisional Patent Application No. 63/406,865, entitled "SYSTEMS AND METHODS FOR MANAGING APPLICATION DATA", filed on Sep. 15, 2022. The entire contents of U.S. Provisional Patent Application No. 63/406,865 are hereby incorporated by reference for all purposes.

FIELD

The described embodiments relate to systems and methods for managing applications. In some example embodiments, the systems and methods can relate to managing application data changes.

BACKGROUND

In today's digital age, many applications are completed online. For example, job seekers can submit applications directly to a potential employer's online application system. In another example, a third-party application system can receive applications from a prospective student for a plurality of academic programs and forward the program applications to respective institutions offering the academic programs. Such online applications can include a variety of data, typically stored in a structured database.

Application data can be collected from applicants over time. For example, applicants may complete a first portion of an application in a first instance. In a second instance at a later time, applicants can resume the application and complete another portion of the application. Application data can also be revised or updated over time. That is, application data is often changing. In order to identify application data that requires revision or update, it can be desirable to keep track of the data submitted in each application. To manage such changes, a parallel database is typically maintained to track the changes. However, the creation and maintenance of a parallel database for tracking data changes increases complexity and requires greater processing and resources. Furthermore, data included in different applications for the same applicant can vary. Accordingly, managing application data for multiple applications can be complex, untimely, and inefficient.

SUMMARY

The various embodiments described herein generally relate to systems (and associated methods) for managing applications. The disclosed methods and systems can relate to managing application data.

An example system for managing application data includes one or more storage devices; a management communication component; and a management processor in communication with the one or more storage devices and a plurality of computing devices via the management communication component. The management processor is operable to: receive, from a computing device of the plurality of computing devices, an initial application data for an applicant; store, at the one or more storage devices, the initial application data; generate an initial cryptographic hash based on the initial application data; generate, for display at the computing device, a preview of the first application for the applicant based on the initial cryptographic hash; and receive, from the computing device, subsequent application data for the applicant. The initial application data can include data objects corresponding to one or more fields of a first application. The subsequent application data can include data objects corresponding to one or more fields of the first application. For each subsequent application data, the management processor can be further operable to store, at the one or more storage devices, the subsequent application data as a separate and distinct record; generate a subsequent cryptographic hash based on a current immediate prior cryptographic hash and the subsequent application data; and generate, for display at the computing device, a preview of the first application based on the subsequent cryptographic hash.

In at least one embodiment, the subsequent application data can include a second application data; and the current immediate prior cryptographic hash for the second application data can be the initial cryptographic hash.

In at least one embodiment, the subsequent application data can include a third application data; and the current immediate prior cryptographic hash for the third application data can be the second cryptographic hash.

In at least one embodiment, the management processor can be operable to revert to prior stored application data by generating a reverting cryptographic hash based on a current immediate prior cryptographic hash and the prior stored application data; and generating, for display at the computing device, a preview of the reverted application based on the reverting cryptographic hash. The prior stored application data can be one of the initial application data or one of the subsequent application data.

In at least one embodiment, the management processor can be operable to store, at the one or more storage devices, the prior stored application data as a separate and distinct record again.

In at least one embodiment, the current immediate prior cryptographic hash for the reversion can be the third cryptographic hash.

In at least one embodiment, the management processor can be further operable to, immediately after reverting to prior stored application data: receive, from the computing device, additional subsequent application data for the applicant; store, at the one or more storage devices, the additional subsequent application data as a separate and distinct record; generate a subsequent cryptographic hash based on the reverting cryptographic hash and the additional subsequent application data; and generate, for display at the computing device, a preview of the first application based on the additional subsequent cryptographic hash. The subsequent application data can include data objects corresponding to one or more fields of the first application.

In at least one embodiment, the management processor can be operable to receive, from the computing device, a request to revert to prior stored application data.

In at least one embodiment, the management processor can be operable to: validate application data stored in the one or more storage devices; and in response to determining that application data stored in the one or more storage devices is invalid, revert to prior stored application data.

In at least one embodiment, the management processor can be operable to: receive, from the computing device, approval of the first application being previewed. In response to receiving the approval, the management processor can be operable to validate application data for the first application being previewed. In response to determining that application data for the first application being previewed is invalid, the management processor can be operable to revert to prior stored application data. Otherwise the management processor can be operable to transmit, to another computing device, the first application data for the first application being previewed. The other computing device can be associated with an institution to which the first application is being made.

In at least one embodiment, the management processor determining that application data for the first application being previewed is invalid can include the management processor determining that data objects corresponding to one or more fields of the first application is incomplete.

In at least one embodiment, the management processor can be operable to generate, for display at the computing device, a preview of a second application based on a prior cryptographic hash of the first application.

In at least one embodiment, a type of the second application can be different from a type of the first application.

In at least one embodiment, a type of the first application can be at least one of a group comprising an academic program application, an employment application, a certificate application, a financial application, an insurance application, and a social service application.

In at least one embodiment, the subsequent application data and the initial application data can correspond to at least one field that is same.

In at least one embodiment, the one or more fields of the first application can be at least one of a group comprising personal information, an education record, an employment record, a training/certificate record, a volunteer record, an extra-curricular record, and a publication record.

In at least one embodiment, the management processor can be operable to transmit the initial, subsequent, and reverting cryptographic hashes, to one or more additional processors.

In at least one embodiment, the initial, subsequent, and reverting cryptographic hashes can be further based on a current timestamp.

In another broad aspect, a computer-implemented method for managing application data is disclosed. The method involves operating a management processor to: receive, from a computing device, an initial application data for an applicant; store, at one or more storage devices, the initial application data; generate an initial cryptographic hash based on the initial application data; generate, for display at the computing device, a preview of the first application for the applicant based on the initial cryptographic hash; and receive, from the computing device, subsequent application data for the applicant. The initial application data can include data objects corresponding to one or more fields of a first application. The subsequent application data can include data objects corresponding to one or more fields of the first application. The method can further involve operating the management processor to, for each subsequent application data, store, at the one or more storage devices, the subsequent application data as a separate and distinct record; generate a subsequent cryptographic hash based on a current immediate prior cryptographic hash and the subsequent application data; and generate, for display at the computing device, a preview of the first application based on the subsequent cryptographic hash.

In at least one embodiment, the subsequent application data can include a second application data; and the current immediate prior cryptographic hash for the second application data can be the initial cryptographic hash.

In at least one embodiment, the subsequent application data can include a third application data; and the current immediate prior cryptographic hash for the third application data can be the second cryptographic hash.

In at least one embodiment, the method can involve operating the management processor to revert to prior stored application data by generating a reverting cryptographic hash based on a current immediate prior cryptographic hash and the prior stored application data; and generating, for display at the computing device, a preview of the reverted application based on the reverting cryptographic hash. The prior stored application data can be one of the initial application data or one of the subsequent application data.

In at least one embodiment, the method can involve operating the management processor to store, at the one or more storage devices, the prior stored application data as a separate and distinct record again.

In at least one embodiment, the current immediate prior cryptographic hash for the reversion can be the third cryptographic hash.

In at least one embodiment, the method can involve operating the management processor to, immediately after reverting to prior stored application data: receive, from the computing device, additional subsequent application data for the applicant; store, at the one or more storage devices, the additional subsequent application data as a separate and distinct record; generate a subsequent cryptographic hash based on the reverting cryptographic hash and the additional subsequent application data; and generate, for display at the computing device, a preview of the first application based on the additional subsequent cryptographic hash. The subsequent application data can include data objects corresponding to one or more fields of the first application.

In at least one embodiment, the method can involve operating the management processor to receive, from the computing device, a request to revert to prior stored application data.

In at least one embodiment, the method can involve operating the management processor to: validate application data stored in the one or more storage devices; and in response to determining that application data stored in the one or more storage devices is invalid, revert to prior stored application data.

In at least one embodiment, the method can involve operating the management processor to receive, from the computing device, approval of the first application being previewed. In response to receiving the approval, the management processor can validate application data for the first application being previewed. In response to determining that application data for the first application being previewed is invalid, the management processor can revert to prior stored application data. Otherwise, the management processor can transmit, to another computing device, the first application data for the first application being previewed. The other computing device can be associated with an institution to which the first application is being made.

In at least one embodiment, operating the management processor to determine that application data for the first application being previewed is invalid can involve operating the management processor to determine that data objects corresponding to one or more fields of the first application is incomplete.

In at least one embodiment, the method can involve operating the management processor to generate, for display at the computing device, a preview of a second application based on a prior cryptographic hash of the first application.

In at least one embodiment, a type of the second application can be different from a type of the first application.

In at least one embodiment, the first application can be at least one of a group comprising an academic program application, an employment application, a certificate application, a financial application, an insurance application, and a social service application.

In at least one embodiment, the subsequent application data and the initial application data can correspond to at least one field that is same.

In at least one embodiment, the one or more fields of the first application can be at least one of a group comprising a personal information record, an education record, an employment record, a training/certificate record, a volunteer record, an extra-curricular record, and a publication record.

In at least one embodiment, the method comprises operating the management processor to transmit the initial, subsequent, and reverting cryptographic hashes, to one or more additional processors.

In at least one embodiment, the initial, subsequent, and reverting cryptographic hashes can be further based on a current timestamp.

BRIEF DESCRIPTION OF THE DRAWINGS

Several embodiments will now be described in detail with reference to the drawings, in which.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The various embodiments described herein generally relate to methods (and associated systems configured to implement the methods) of managing application data. Applications can be directed to a variety of opportunities, including but not limited to academic programs, employment, certifications, financial products, insurance products, and social services. A receiving entity can assess the application and determine whether the application is successful or not. For example, receiving entities can include but is not limited to academic institutions, employers, licensing bodies, financial service providers, insurance providers, and government or non-profit entities. Furthermore, applicants can be an individual or an entity, such as a corporation.

Applications can include a variety of fields, to which the applicants provide data objects. The data objects are typically stored in a structured database. The data objects can change as they can be collected in a piecemeal fashion and application data can be updated over time.

For example, an application to an academic program may require personal information, academic information, writing samples, and letters of recommendation. Upon creation of an application (i.e., starting the application), the applicant can provide some information from a computing device associated with the applicant. For example, personal information can include a name, mailing address, residential address, and birthdate and academic information can include a school name, courses, and grades. The applicant can provide any such information that is readily available to the applicant. At a later time, the applicant can provide additional information, such as writing samples, letters of recommendation, additional courses and grades and also modify previously provided information (e.g., correcting courses or grades previously provided).

In addition, an applicant can submit multiple applications with different program application data. For example, a program application can include writing samples but another program application may not require or include writing samples.

Until an application is submitted, application data (i.e., data objects corresponding to fields of an application) can be added, modified, and/or removed. The application can be considered as having a different state with each such change. That is, the application can change states in the interim. Typically, a parallel database is maintained to track the data object changes. However, the creation and maintenance of a parallel database for tracking data object changes increases complexity and requires greater processing and resources.

Figure 1:
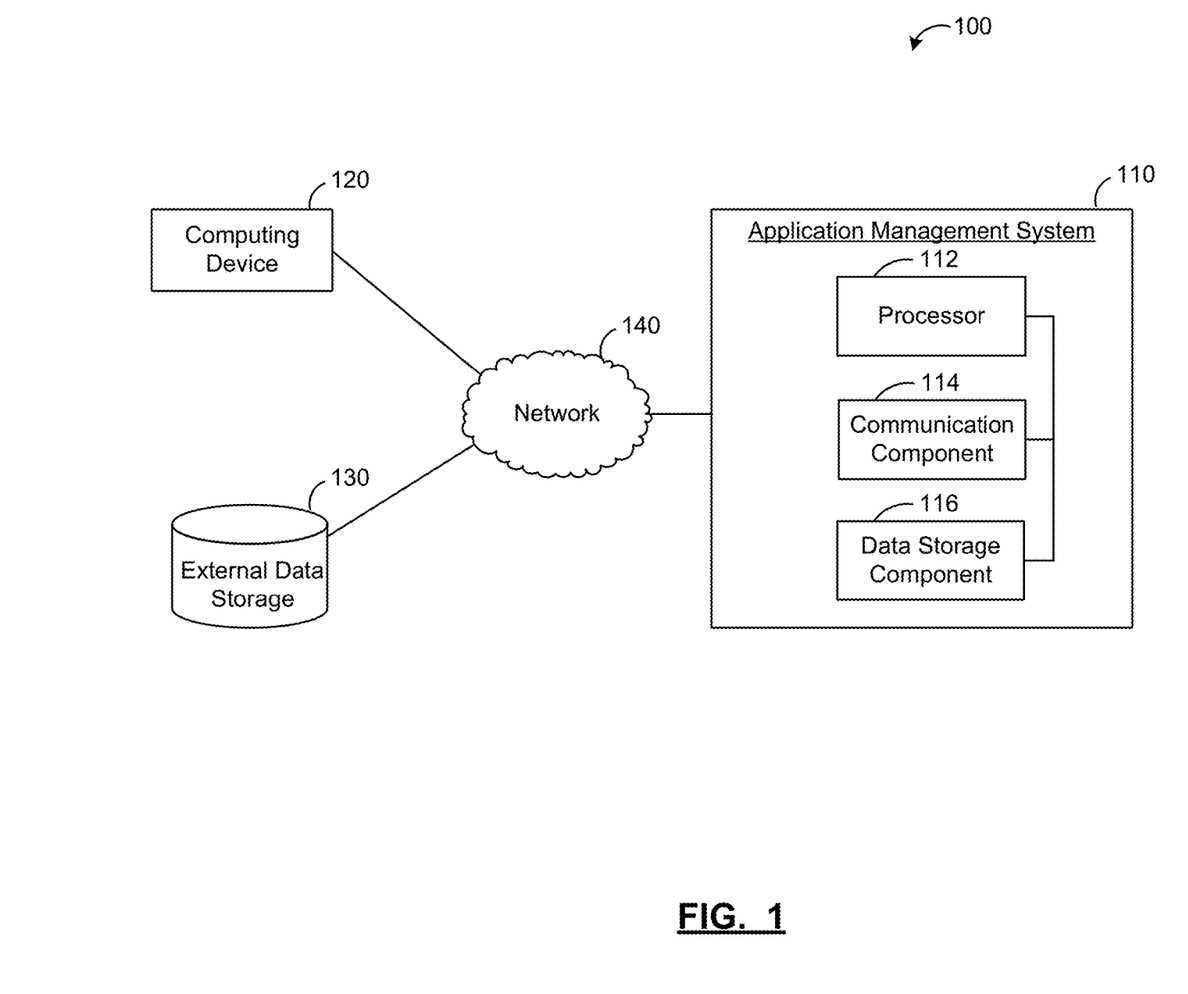
FIG. 1 is a block diagram of components interacting with an example application management system in accordance with an example embodiment.

Reference is now made to FIG. 1, which illustrates a block diagram 100 of components interacting with an example application management system 110. As shown in FIG. 1, the application management system 110 is in communication with a computing device 120 and an external data storage 130 via a network 140.

The application management system 110 includes a management processor 112, a management communication component 114, and a management data storage component 116. The application management system 110 can be provided on one or more computer servers that may be distributed over a wide geographic area and connected via the network 140.

The application management system 110 can perform various functions related to processing applications. For example, the application management system 110 can receive application data for an application and transmit the application data to an employer accepting applications. Again, the application data can be related to an applicant and/or the application data can also be used for a plurality of applications. The application management system 110 can receive applications for a plurality of employment opportunities and transmit applications to respective employers accepting applications. The plurality of employment opportunities can be with one or more employers.

The application management system 110 can receive selection data associating an applicant with one or more employment opportunities and transmit the application data based on the selection data. Furthermore, the selection data can include preliminary selection data (e.g., tentative employment opportunities to apply to) and actual selection data (e.g., confirmed employment opportunities to apply to).

The application management system 110 can receive acceptance data associating an employment opportunity with one or more applicants and transmit the acceptance data to applicants. Furthermore, the acceptance data can include preliminary acceptance data (e.g., applicants moving onto a second round of review) and confirmed acceptance data (e.g., one or more successful applicants).

In another example, the application management system 110 can receive application data for an application and transmit the application data to an academic program accepting applications. Furthermore, the application data can be related to an applicant. The application data can also be used for a plurality of applications. As well, the application management system 110 can receive applications for a plurality of academic programs and transmit applications to respective academic programs. The plurality of academic programs can be associated with one or more institutions. For example, the plurality of academic programs can be at one or more academic institutions.

The application management system 110 can receive selection data associating an applicant with one or more academic programs and transmit the application data based on the selection data. Furthermore, the selection data can include preliminary selection data (e.g., tentative programs to apply to) and actual selection data (e.g., confirmed programs to apply to).

The application management system 110 can receive acceptance data associating an academic program with one or more applicants and transmit the acceptance data to applicants. As well, the acceptance data can include conditional acceptance data (e.g., one or more conditionally accepted applicants) and confirmed acceptance data (e.g., one or more successful applicants).

It will be appreciated that there can be a wide variety of application data. Application data can include, but is not limited to, personal information and/or records related to education, employment, training, certificates, volunteer activities, extra-curricular activities, publications, banking, finances, residency (including previous and future residency), insurance, and contact information (including phone, email, social media).

The management processor 112, the management communication component 114, and the management data storage component 116 can be combined into a fewer number of components or can be separated into further components. The management processor 112, the management communication component 114, and the management data storage component 116 may be implemented in software or hardware, or a combination of software and hardware.

The management processor 112 can operate to control the operation of the application management system 110. The management processor 112 can initiate and manage the operations of each of the other components within the application management system 110. The management processor 112 may be any suitable processors, controllers or digital signal processors that can provide sufficient processing power depending on the configuration, purposes and requirements of the application management system 110. In some embodiments, the management processor 112 can include more than one processor with each processor being configured to perform different dedicated tasks.

The management communication component 114 may include any interface that enables the application management system 110 to communicate with other devices and systems. In some embodiments, the management communication component 114 can include at least one of a serial port, a parallel port or a USB port. The management communication component 114 may also include at least one of an Internet, Local Area Network (LAN), Ethernet, Firewire, modem or digital subscriber line connection. Various combinations of these elements may be incorporated within the management communication component 114.

For example, the management communication component 114 may receive input from various input devices, such as a mouse, a keyboard, a touch screen, a thumbwheel, a track-pad, a track-ball, a card-reader, voice recognition software and the like depending on the requirements and implementation of the application management system 110.

The management data storage component 116 can include RAM, ROM, one or more hard drives, one or more flash drives or some other suitable data storage elements such as disk drives, etc. Similar to the management data storage component 116, the external data storage 130 can also include RAM, ROM, one or more hard drives, one or more flash drives or some other suitable data storage elements such as disk drives, etc.

The management data storage component 116 and the external data storage 130 can also include one or more databases for storing information relating to applicant data, application data associated with the applicant data, institution data, and program data associated with the institution data. Furthermore, the one or more databases can also store information related to selection data, including but not limited to preliminary and/or actual selection data, and acceptance data, including but not limited to conditional acceptance data and confirmed acceptance data.

The computing device 120 can include any networked device operable to connect to the network 140. A networked device is a device capable of communicating with other devices through a network such as the network 140. A networked device may couple to the network 140 through a wired or wireless connection. Although only one computing device 120 is shown in FIG. 1, it will be understood that more computing devices 120 can connect to the network 140.

The computing device 120 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

The computing device 120 can be associated with any one of an applicant, an administrator of a program at an institution, or an administrator of an employment opportunity with a potential employer. The applicant and/or administrators can provide authentication credentials to access the network 140 and transmit data to the application management system 110.

The network 140 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the application management system 110, the computing device 120 and the external data storage 130.

Figure 2:
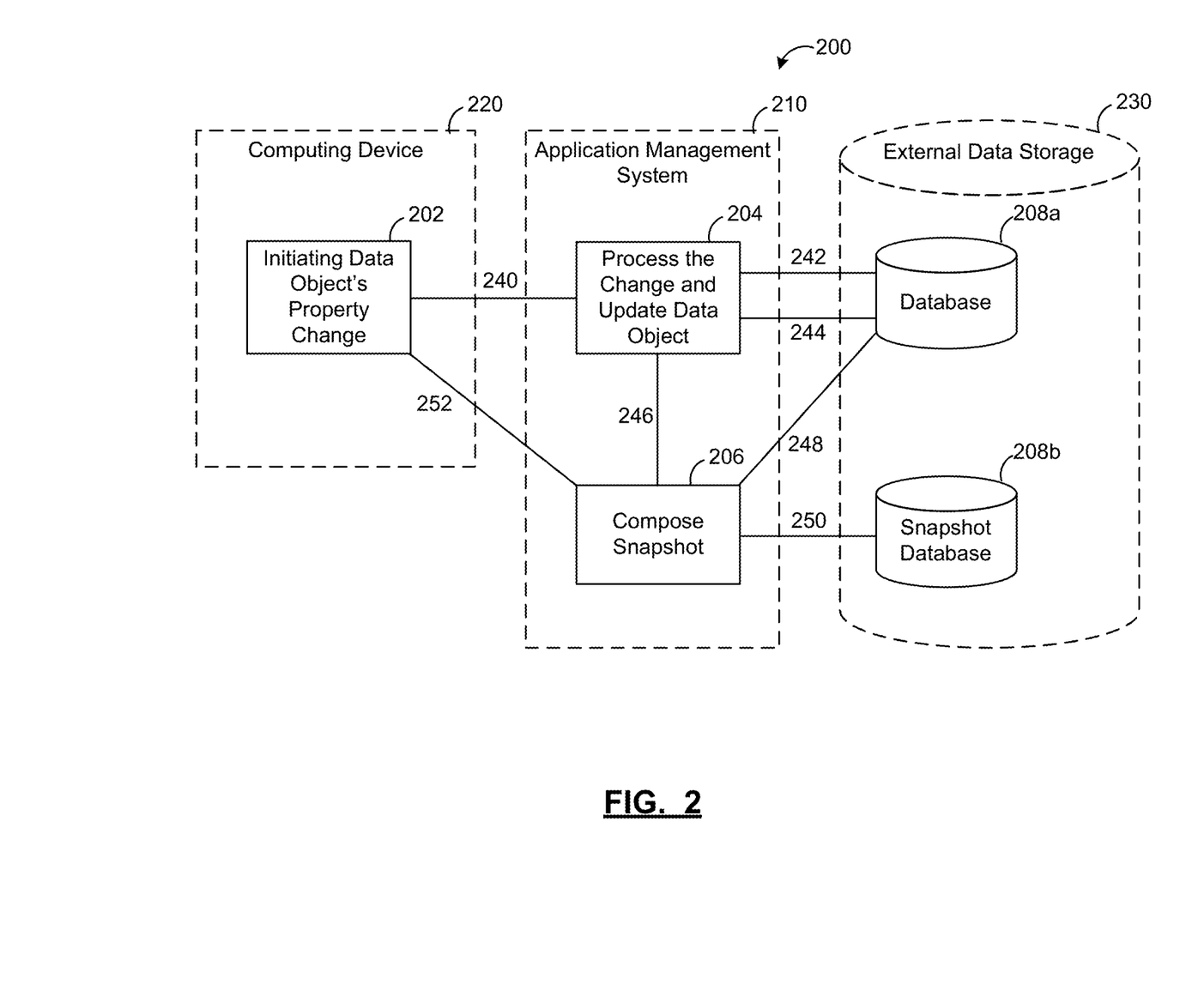
FIG. 2 is a block diagram of a typical workflow for managing database updates.

Reference is now made to FIG. 2, which illustrates a typical workflow 200 for managing database updates. Workflow 200 can be implemented by an application management system, such as application management system 210. Similar to application management system 110, application management system 210 can be in communication with a computing device, such as computing device 220 and external data storage, such as external data storage 230. It will be understood that although only one computing device 220 and only one external data storage 230 is shown in FIG. 2, application management system 210 can be in communication with more computing devices and more external data storage. Furthermore, application management system 210 can be provided on one or more computer servers that may be distributed over a wide geographic area and connected via a network.

Workflow 200 can begin at computing device 220 initiating 202 a change to a property of a data object. The change is transmitted 240 to application management system 210. In response to receiving the data object change, application management system 210 can process 204 the change and transmit 242 the change to a database 208a on the external data storage 230. After the database 208a has been updated, the change is reported 244 back to application management system 210.

Application management system 210 proceeds to initiate 246 a snapshot of the database to be taken to capture the change. Application management system 210 can access 248 the database 208a to compose 206 a snapshot of the application data. That is, application management system 210 can read the updated application data in the database 208a and store 250 a copy of the updated application data in a snapshot database 208b. After a copy of the updated application data is stored 250 in the snapshot database 208b, the workflow 200 can return 252 to the computing device 220 to await further actions.

In some cases, it may be necessary to return to a previous state of the application—that is to restore previous application data. To do so, application management system 210 can retrieve a copy of the data object from the snapshot database 208b and restore it in the database 208a. That is, applicant management system 210 can change the data objects of the database 208a to be consistent with a previous version, retrieved from the snapshot database 208b.

As shown in workflow 200, maintenance of an additional database, such as snapshot database 208b, to track changes to the database 208a increases complexity with the initiation 246 of a snapshot, generation 248 of the snapshot, storage 250 of the snapshot, and reporting 252 completion of the snapshot. For example, application data in the snapshot database 208b is independent of other application data. As such, additional processing can be required to protect against modifications in an already existing snapshot.

Figure 3A:
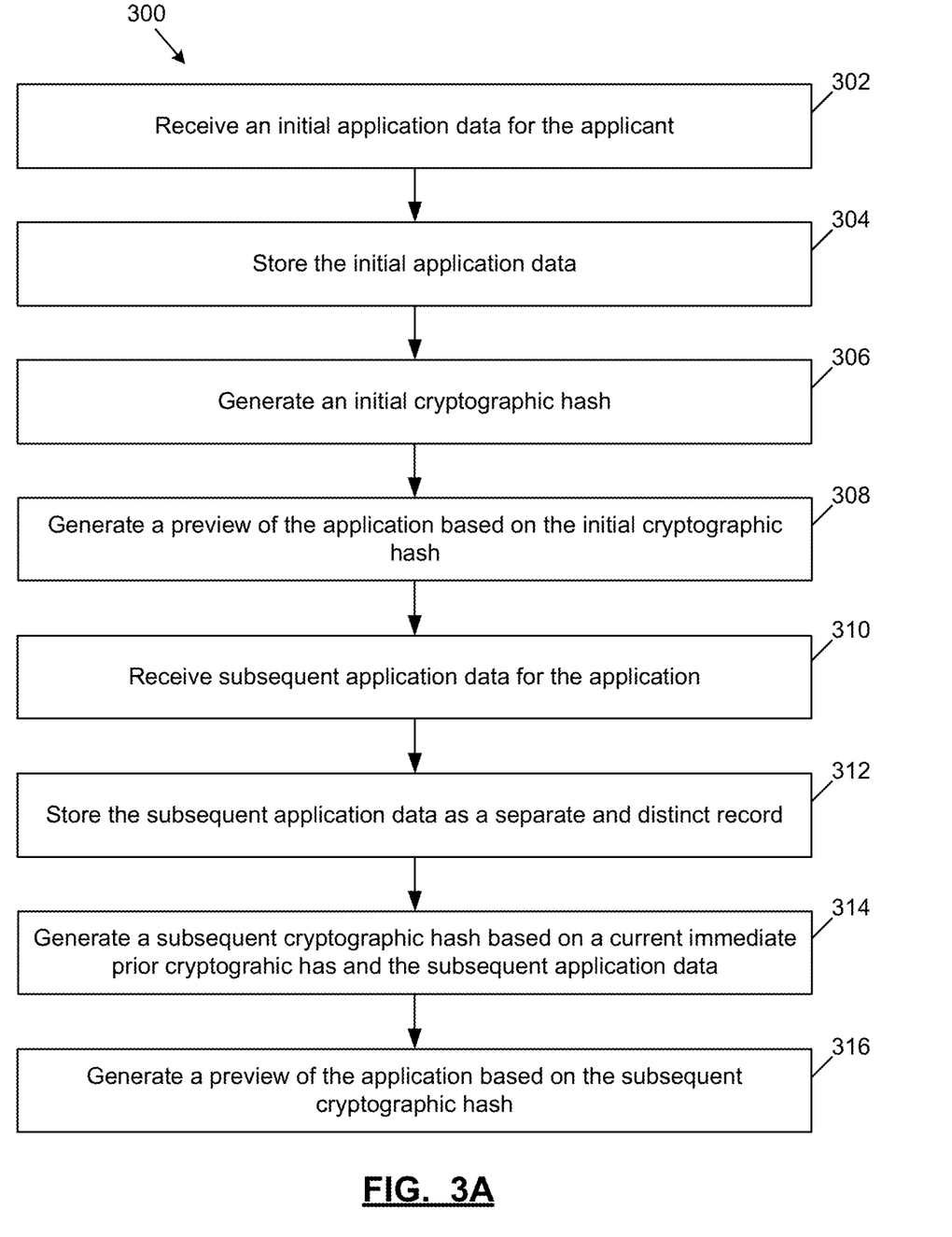
FIG. 3A is a flowchart of an example method of managing application data, in accordance with an example embodiment.
Figure 3B:
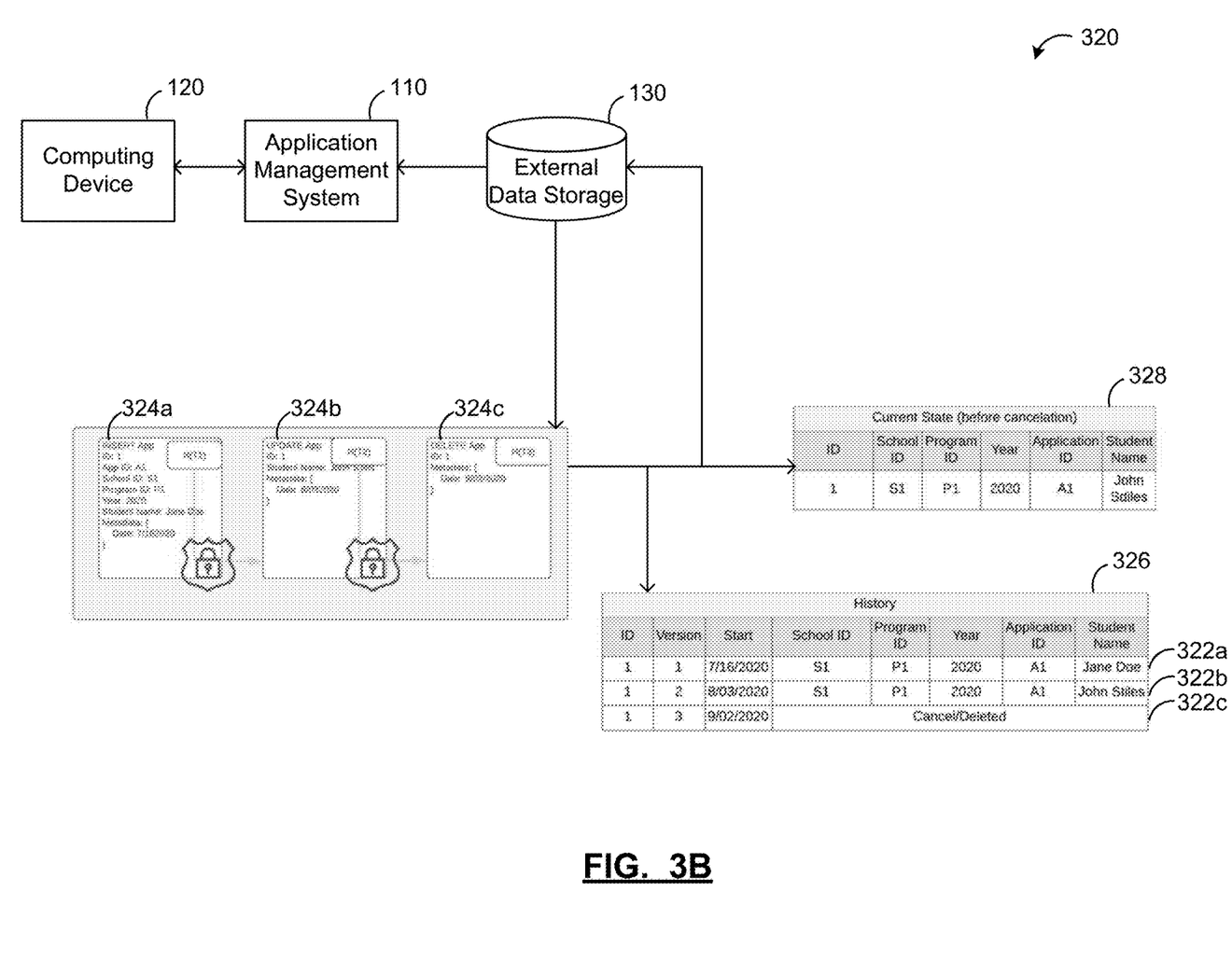
FIG. 3B is a block diagram of example database updates, in accordance with an example embodiment.

Reference is now made to FIG. 3A, which illustrates a flowchart of an example method 300 of managing application data, in accordance with an example embodiment. To assist with the description of method 300, reference will be made simultaneously to FIG. 3B, which shows a block diagram 320 of example database updates, in accordance with an example embodiment. As shown in FIG. 3B, a data management system, such as data application management system 110 having a processor 112 can be configured to implement method 300.

Method 300 can begin at 302 with the receipt of initial application data 322a for an applicant at application management system 110. The initial application data 322a can be transmitted via a network, such as network 140, from a computing device, such as computing device 120. The initial application data 322a can include data objects corresponding to one or more fields of a first application.

At 304, application management system 110 can store the initial application data 322a at one or more storage devices, such as external data storage 130. The application data 322a can be stored as a record in a ledger 326. The ledger 326 can be accessed as a conventional database.

At 306, application management system 110 can generate an initial cryptographic hash 324a based on the initial application data. In at least one embodiment the initial cryptographic hash 324a can also be based on a timestamp. The timestamp can relate to the time at which the initial application data 322a is transmitted from computing device 120 and/or received at application management system 110.

In some embodiments, application management system 110 can transmit the initial cryptographic hash 324a to one or more additional processors.

At 308, application management system 110 can generate a preview of the first application for the applicant based on the initial cryptographic hash 324a. That is, the preview can include the initial application data 322a. The preview can be displayed on a graphical user interface at computing device 120.

At 310, application management system 110 can receive subsequent application data 322b for the applicant. The subsequent application data 322b can be transmitted via network 140 from computing device 120. The subsequent application data 322b can include data objects corresponding to one or more fields of the first application.

For example, an applicant can complete an application in a piecemeal fashion. With each additional information or modification to existing information, application management system 110 receive subsequent application data 322b. That is, subsequent application data 322b can relate to additional data objects or modifications to existing data objects. With each subsequent application data 322b received, the application has a different state.

In some embodiments, subsequent application data 322b for the applicant can be received from different sources, that is, a different computing device 120. For example, with an academic program application can include academic information and letters of recommendation. Academic information (e.g., transcripts) can be provided by a computing device 120 associated with an institution, such as the school that the applicant attended. Letters of recommendation can be provided by a computing device 120 associated with the person making the recommendation.

At 312, application management system 110 can store each of the subsequent application data 322b at external data storage 130. Furthermore, each of the subsequent application data 322b is stored in the ledger 326 as a separate and distinct record from existing application data (e.g., initial application data 322a or prior application data).

By storing each subsequent application data 322b in a ledger 326 as a separate and distinct record, prior application data is not overwritten and instead retained. Each subsequent application data 322b can be recorded as a new record of the same data object, thus preserving the integrity of each field or data object. Furthermore, the entire data object is stored as a record, not merely changes to the data object.

At 314, application management system 110 can generate a subsequent cryptographic hash 324b for each subsequent application data 322b. Each subsequent cryptographic hash 324b can be based on a current immediate prior cryptographic hash and the subsequent application data 322b. In at least one embodiment the subsequent cryptographic hash 324b can also be based on a timestamp. The timestamp can relate to the time at which the subsequent application data 322*b* is transmitted from computing device 120 and/or received at application management system 110.

For example, for a second application data 322*b*, the second cryptographic hash 324*b* can be based on the initial cryptographic hash 324*a* and the second application data 322*b*. That is, the initial cryptographic hash 324*a* serves at the current immediate prior cryptographic hash for the second cryptographic hash 324*b*.

As a further example, for a third application data, the third cryptographic hash can be based on the second cryptographic hash 324*b* and the third application data. That is, the second cryptographic hash 324*b* serves at the current immediate prior cryptographic hash for the third cryptographic hash.

In at least one embodiment, application management system 110 can transmit the subsequent cryptographic hash to one or more additional processors.

At 316, application management system 110 can generate a preview 328 of the first application based on the subsequent cryptographic hash 324*b*. That is, the preview 328 can include the subsequent application data 322*b*. The preview 328 can be displayed on the graphical user interface at computing device 120.

It will be understood that 310 to 316 can be repeated as data objects are changed (added, modified, or removed). Furthermore, by preserving the integrity of each field or data object, method 300 can preserve each state of the application. It will be appreciated that method 300 can implement a continuous chain of records (i.e., blockchain). Each record (e.g., subsequent application data) is chained with other records to form a continuum of immutable records. Furthermore, the chain of records is immutable and can be easily traversed.

For example, in some embodiments, application management system 110 can revert to prior stored application data, such as the initial application data 322*a* stored at 304 or one of the subsequent application data stored at 312. The application management system 110 can store the reversion 322*c* as a separate and distinct record in the ledger 326. To revert to prior stored application data, application management system 110 can generate a reverting cryptographic hash 324*c*. The reverting cryptographic hash 324*c* can be based on a current immediate prior cryptographic hash and the prior stored application data. In at least one embodiment the reverting cryptographic hash 324*c* can also be based on a timestamp. In at least one embodiment, application management system 110 can transmit the reverting cryptographic hash to one or more additional processors.

Application management system 110 can generate a preview of the reverted application based on the reverting cryptographic hash 324*c*. That is, the preview can include the prior stored application data. The preview can be displayed on the graphical user interface at computing device 120. In at least one embodiment, application management system 110 also store the prior application data again at the one or more storage devices.

Continuing from the example above, after the generating the third cryptographic hash 324*c*, application management system 110 can revert to either the second application data or the initial application data 322*a*. The reverting cryptographic hash 324*c* can be based on the third cryptographic hash and the second application data if reverting to the second application data. Alternatively, the reverting cryptographic hash 324*c* can be based on the third cryptographic hash and the initial application data 322*a* if reverting to the initial application data 322*a*. The third cryptographic hash serves at the current immediate prior cryptographic hash for the reverting cryptographic hash 324*c*.

Figure 4A:
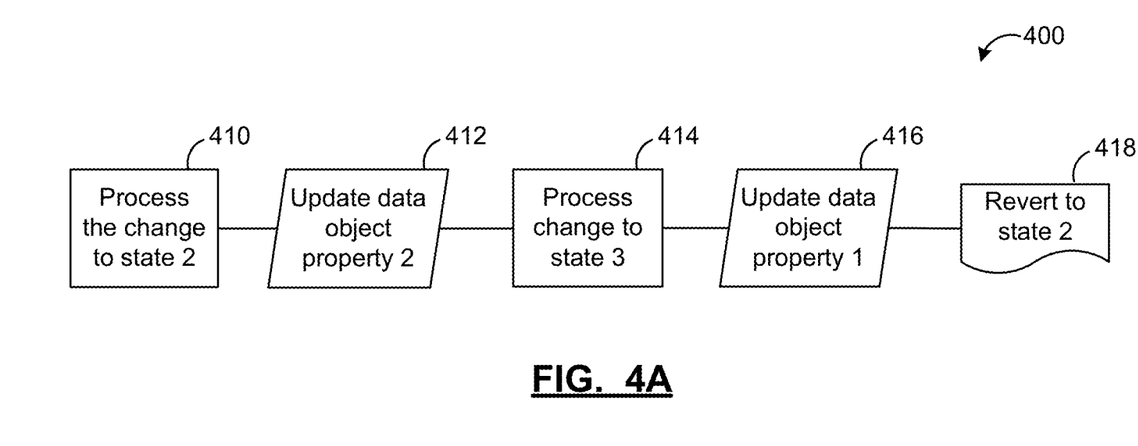
FIG. 4A is an example workflow at an example application management system for reverting to prior stored application data, in accordance with an example embodiment.

Reference is now made to FIG. 4A, which illustrates an example workflow 400 at an example application management system, such as application management system 110, for reverting to prior application data, in accordance with an example embodiment.

At 410, application management system 110 can process a change of the application, such as to state 2. That is, application management system 110 can receive the subsequent application data, similar to 310, and generate the corresponding subsequent cryptographic hash, similar to 314. For example, the change can involve an update to the data object for property (i.e., field) 2 of the application. The cryptographic hash generated at 410 can use an initial cryptographic hash and the subsequent application data received at 410 (i.e., updated data object for property 2).

At 412, application management system 110 can store the subsequent application data, similar to 312. That is, application management system 110 can store the updated data object for property 2 in the ledger as a separate and distinct record from existing application data (e.g., initial application data).

At 414, application management system 110 can process another change of the application, such as to state 3. That is, application management system 110 can receive another subsequent application data, similar to 310, and generate the corresponding subsequent cryptographic hash, similar to 314. For example, the change can involve an update to the data object for property 1 of the application. The cryptographic hash generated at 414 can use the subsequent cryptographic hash generated at 410 and the additional subsequent application data received at 414 (i.e., updated data object for property 1).

At 416, application management system 110 can store the subsequent application data, similar to 312. That is, application management system 110 can store the updated data object for property 1 in the ledger as a separate and distinct record from existing application data (e.g., initial application data or application data stored at 412).

At 418, application management system 110 can determine that the application should be reverted to state 2.

Figure 4B:
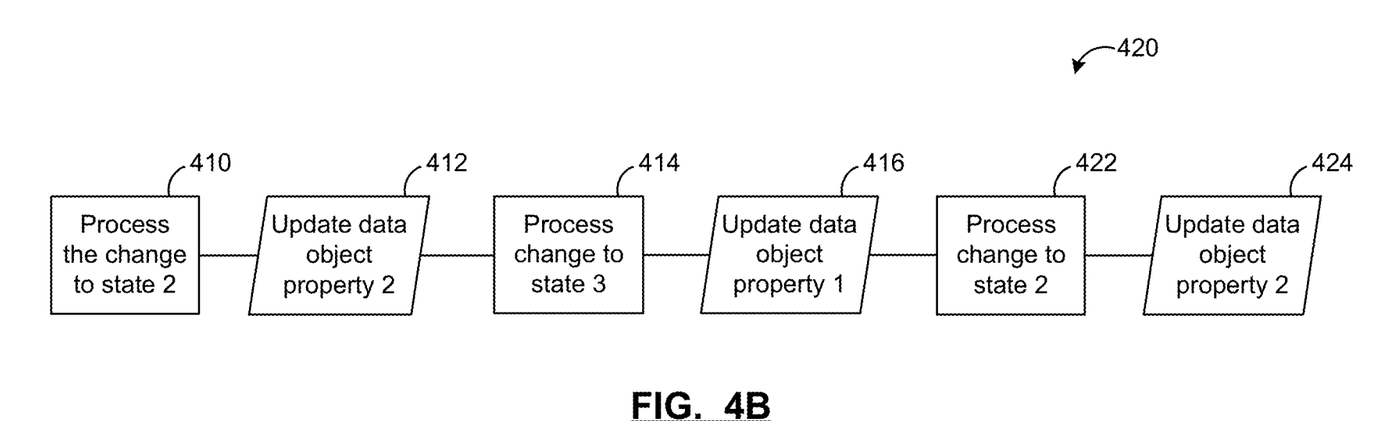
FIG. 4B is a further example workflow of the example workflow of FIG. 4A.

Reference is now made to FIG. 4B, which illustrates a further example workflow 420 of the example workflow of FIG. 4A, after it is determined that the application should be reverted, such as at 418.

At 422, application management system 110 can process the change of the application as being reverted, such as to state 2. That is, applicant management system 110 can access the database to retrieve state 2 and generate the corresponding reverting cryptographic hash. The reverting cryptographic hash generated at 422 can use the cryptographic hash of 410 and the subsequent application data received at 410 (i.e., updated data object for property 2).

At 424, application management system 110 can again, store the updated data object for property 2 in the ledger as a separate and distinct record from existing application data (e.g., initial application data or application data stored at 412 and 416). That is, application management system 110 can store the updated data object again, similar to 412.

Figure 4C:
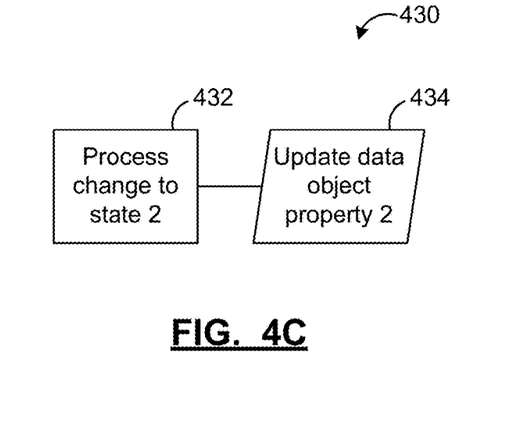
FIG. 4C is an example workflow at a computing device for the example workflow of FIG. 4B.

Reference is now made to FIG. 4C, which illustrates an example workflow 430 at a computing device, such as computing device 120, for the example workflow of FIG. 4B. Workflow 430 corresponds to workflow 420 at computing device 120. That is, computing device 120 merely sees a change of the application back to state 2 at 432 and an update to the data object of property 2 at 434. Computing device 120 does not see that the update to the data object of property 2 is a separate and distinct record in the ledger or database, such as external data storage 130.

In at least one embodiment, application management system 110 can receive, from computing device 120, a request to revert to prior application data. As well, the reverting cryptographic hash can use a timestamp that relates to the time at which the request to revert is transmitted from computing device 120 and/or received at application management system 110.

In at least one embodiment, application management system 110 can determine whether to revert to prior application data. As well, the reverting cryptographic hash can use a timestamp that relates to the time at which the application management system 110 determines that a reversion is required.

For example, application management system 110 can validate application data stored in the one or more storage devices. In response to determining that application data is invalid, application management system 110 can revert to prior application data. There may be various reasons for the application data to be invalid. For example, invalid application data can be a result of malicious activities or inadvertent errors. For example, an incorrect document may be attached to an application. For another example, a field value may be incorrectly entered, incomplete, or may not meet pre-determined criteria (e.g., length).

As another example, application management system 110 can receive, from computing device 120, approval of the application being previewed. In response to receiving the approval, application management system 110 can validate the application data being previewed. In response to determining that application data is invalid application management system 110 can revert to prior application data. If the application data is valid, application management system can transmit the application to another computing device (not shown in FIG. 1). The other computing device can be associated with an institution to which the first application is being made.

It will be understood that in some embodiments, application management system 110 can both, receive requests to revert to prior application data and determine whether to revert to prior application data.

In some embodiments, application management system 110 can receive additional subsequent application data for the applicant immediately after reverting to prior stored application data. The additional subsequent application data can be transmitted via network 140 from computing device 120. The additional subsequent application data can include data objects corresponding to one or more fields of the first application. Application management system 110 can store the additional subsequent application data at external data storage 130. Application management system 110 can generate a subsequent cryptographic hash based on the reverting cryptographic hash and the additional subsequent application data. Application management system 110 can generate a preview of the first application based on the additional subsequent cryptographic hash. That is, the preview can include the additional subsequent cryptographic has. The preview can be displayed on the graphical user interface at computing device 120.

Figure 4D:
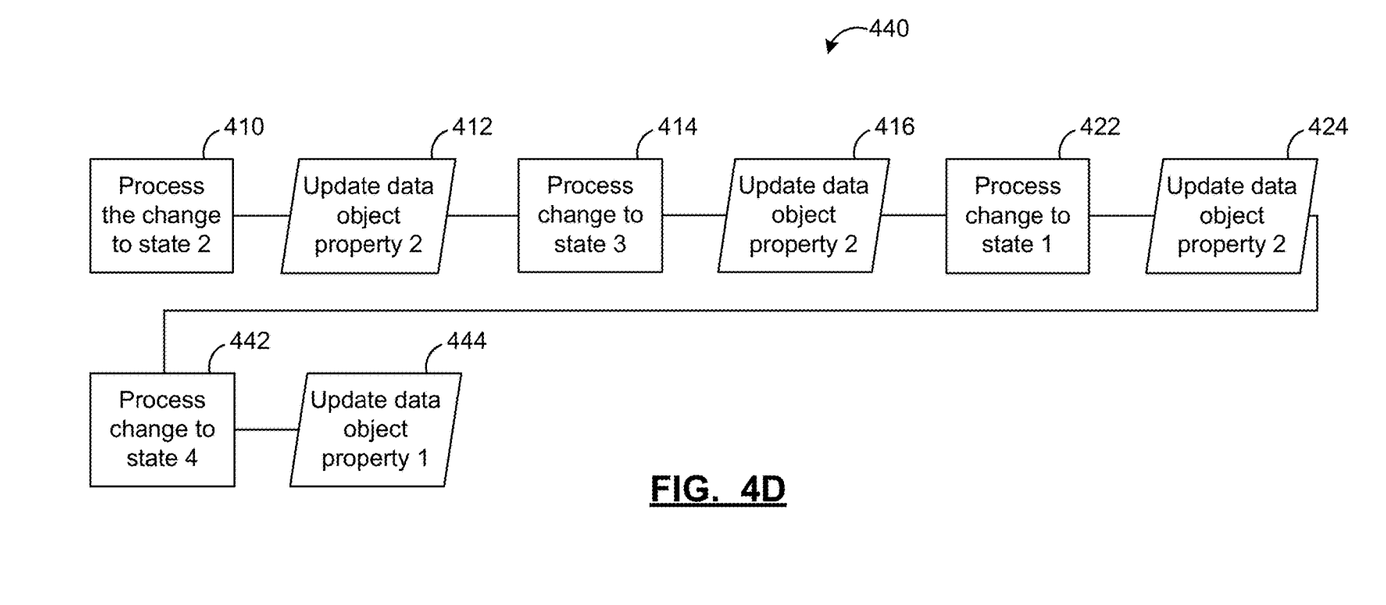
FIG. 4D is a further example workflow of the example workflow of FIG. 4B.

Reference is now made to FIG. 4D, which illustrates a further example workflow 440 of the example workflow of FIG. 4B, after the application has been reverted, such as at 424.

At 442, application management system 110 can process another change of the application, such as to state 4. That is, application management system 110 can receive another subsequent application data, similar to 310, and generate the corresponding subsequent cryptographic hash, similar to 314. For example, the change can involve another update to the data object for property 1 of the application. The cryptographic hash generated at 442 can use the reverting cryptographic hash generated at 422 and the additional subsequent application data received at 442 (i.e., updated data object for property 1).

At 444, application management system 110 can store the subsequent application data, similar to 312. That is, application management system 110 can store the updated data object for property 1 in the ledger as a separate and distinct record from existing application data (e.g., initial application data or application data stored at 412, 416, and 424).

In some embodiments, application data for an applicant can be used for a plurality of applications. For example, applicant management system 110 can generate a preview of a second application based on a prior cryptographic hash of the first application, such as the subsequent application data of 310. The second application can be related to a different program than the first application, a different entity than the first application, or even a different type than the first application. That is, the first and second applications can be for different academic programs at a same academic institution. The first and second application can be for different academic programs at different academic institutions. Furthermore, a first application can be for an academic program while a second application can be for an employment opportunity.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

I claim:

1. A system for managing application data, the system comprising:
   one or more storage devices;
   a management communication component; and
   a management processor in communication with the one or more storage devices and a plurality of computing devices via the management communication component, the management processor being operable to:
      receive, from a computing device of the plurality of computing devices, an initial application data for an applicant, the initial application data comprising data objects corresponding to one or more fields of a first application;
      store, at the one or more storage devices, the initial application data;
      generate an initial cryptographic hash based on the initial application data;
      generate, for display at the computing device, a preview of the first application for the applicant based on the initial cryptographic hash;
      receive, from the computing device, subsequent application data for the applicant, the subsequent application data comprising data objects corresponding to one or more fields of the first application; and
      for each subsequent application data:
         store, at the one or more storage devices, the subsequent application data as a separate and distinct record;
         generate a subsequent cryptographic hash based on a current immediate prior cryptographic hash and the subsequent application data; and
         generate, for display at the computing device, a preview of the first application based on the subsequent cryptographic hash.

2. The system of claim 1, wherein:
   the subsequent application data comprises a second application data; and
   the current immediate prior cryptographic hash for the second application data is the initial cryptographic hash.

3. The system of claim 2, wherein:
   the subsequent application data comprises a third application data; and
   the current immediate prior cryptographic hash for the third application data is the second cryptographic hash.

4. The system of claim 1, wherein the management processor is operable to:
   revert to prior stored application data, the prior stored application data being one of the initial application data or one of the subsequent application data, by:
      generating a reverting cryptographic hash based on a current immediate prior cryptographic hash and the prior stored application data; and
      generating, for display at the computing device, a preview of the reverted application based on the reverting cryptographic hash.

5. The system claim 4, wherein the management processor is operable to store, at the one or more storage devices, the prior stored application data as a separate and distinct record again.

6. The system of claim 1, wherein:
   the subsequent application data comprises a second application data and a third application data;
   the current immediate prior cryptographic hash for the second application data is the initial cryptographic hash;
   the current immediate prior cryptographic hash for the third application data is the second cryptographic hash; and
   the management processor is operable to revert to prior stored application data, the prior stored application data being one of the initial application data or one of the subsequent application data, by:
      generating a reverting cryptographic hash based on the third cryptographic hash and the prior stored application data; and
      generating, for display at the computing device, a preview of the reverted application based on the reverting cryptographic hash.

7. The system of claim 4, wherein the management processor is further operable to, immediately after reverting to prior stored application data:
   receive, from the computing device, additional subsequent application data for the applicant, the subsequent application data comprising data objects corresponding to one or more fields of the first application;
   store, at the one or more storage devices, the additional subsequent application data as a separate and distinct record;
   generate a subsequent cryptographic hash based on the reverting cryptographic hash and the additional subsequent application data; and
   generate, for display at the computing device, a preview of the first application based on the additional subsequent cryptographic hash.

8. The system of claim 4, wherein the management processor is operable to receive, from the computing device, a request to revert to prior stored application data.

9. The system of claim 4, wherein the management processor is operable to:
   validate application data stored in the one or more storage devices; and
   in response to determining that application data stored in the one or more storage devices is invalid, revert to prior stored application data.

10. The system of claim 4, wherein the management processor is operable to:
   receive, from the computing device, approval of the first application being previewed;
   in response to receiving the approval, validate application data for the first application being previewed; and,
   in response to determining that application data for the first application being previewed is invalid, revert to prior stored application data;
   otherwise transmit, to another computing device, the first application data for the first application being previewed, the other computing device being associated with an institution to which the first application is being made.

11. The system of claim 10, wherein the management processor being operable to determine that application data for the first application being previewed is invalid comprises the management processor being operable to determine that data objects corresponding to one or more fields of the first application is incomplete.

12. The system of claim 1, wherein the management processor is operable to generate, for display at the computing device, a preview of a second application based on a prior cryptographic hash of the first application.

13. The system of claim 12, wherein a type of the second application is different from a type of the first application.

14. The system of claim 1, wherein a type of the first application is at least one of a group comprising an academic program application, an employment application, a certificate application, a financial application, an insurance application, and a social service application.

15. The system of claim 1, wherein the subsequent application data and the initial application data correspond to at least one field that is same.

16. The system of claim 1, wherein the one or more fields of the first application is at least one of a group comprising personal information, an education record, an employment record, a training/certificate record, a volunteer record, an extra-curricular record, and a publication record.

17. The system of claim 1, wherein the management processor is operable to transmit the initial, subsequent, and reverting cryptographic hashes, to one or more additional processors.

18. The system of claim 1, wherein the initial, subsequent, and reverting cryptographic hashes are further based on a current timestamp.

19. A method of managing application data, the method comprising:
   operating a management processor to:
      receive, from a computing device, an initial application data for an applicant, the initial application data comprising data objects corresponding to one or more fields of a first application;
      store, at one or more storage devices, the initial application data;
      generate an initial cryptographic hash based on the initial application data;
      generate, for display at the computing device, a preview of the first application for the applicant based on the initial cryptographic hash;
      receive, from the computing device, subsequent application data for the applicant, the subsequent application data comprising data objects corresponding to one or more fields of the first application; and
      for each subsequent application data:
         store, at the one or more storage devices, the subsequent application data as a separate and distinct record;
         generate a subsequent cryptographic hash based on a current immediate prior cryptographic hash and the subsequent application data; and
         generate, for display at the computing device, a preview of the first application based on the subsequent cryptographic hash.

20. The method of claim 19 comprises operating the management processor to:
   revert to prior stored application data, the prior stored application data being one of the initial application data or one of the subsequent application data, by:
      generating a reverting cryptographic hash based on a current immediate prior cryptographic hash and the prior stored application data; and
      generating, for display at the computing device, a preview of the reverted application based on the reverting cryptographic hash.

* * * * *